Oct. 29, 1968  J. E. LARSEN  3,407,493
PROCESS OF DEVELOPING ELECTRICAL COILS
IN INDUCTIVE DEVICES
Original Filed July 28, 1966  3 Sheets-Sheet 1
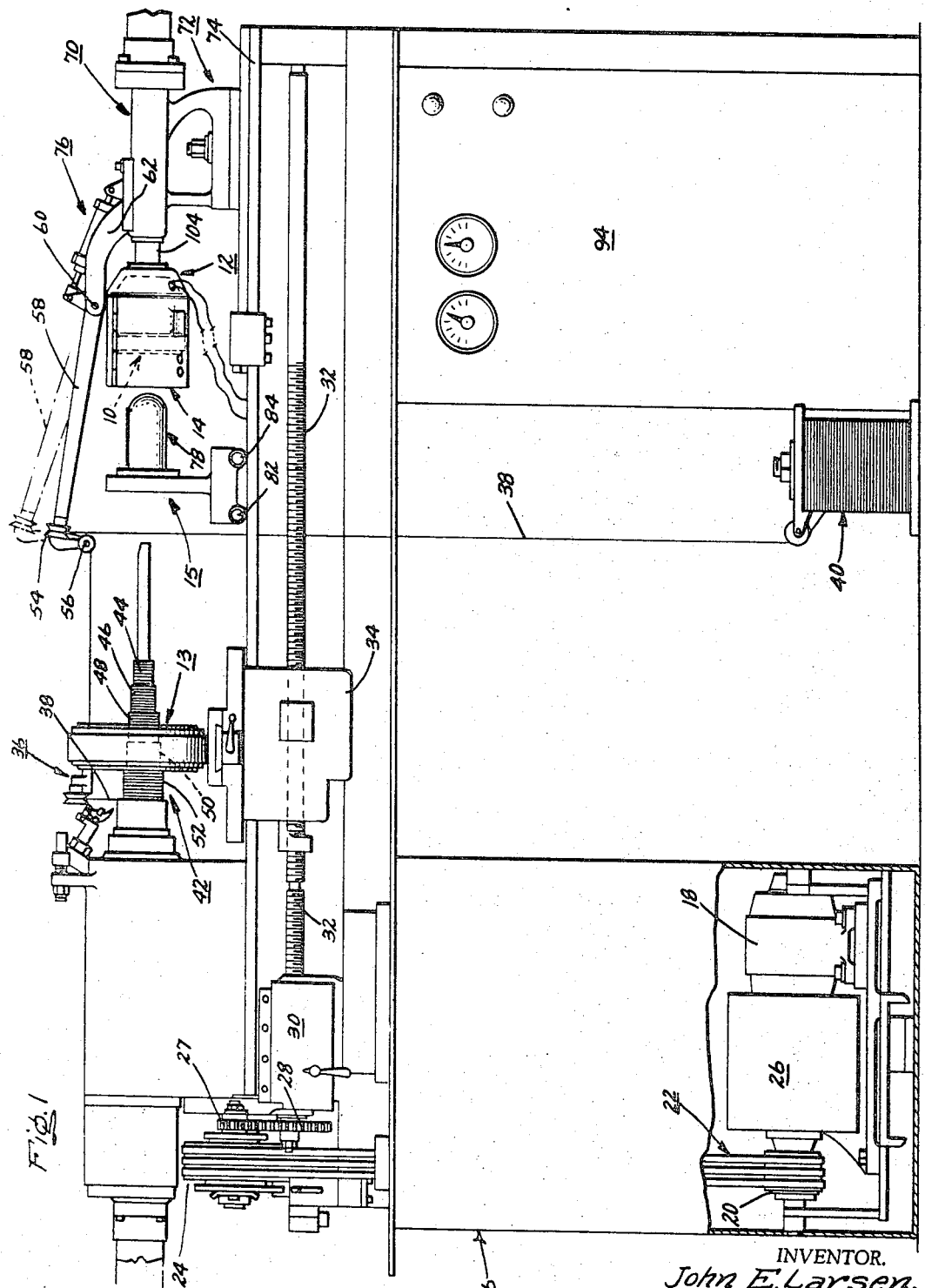
INVENTOR.
John E. Larsen,
BY John N. Stoudt
Attorney.

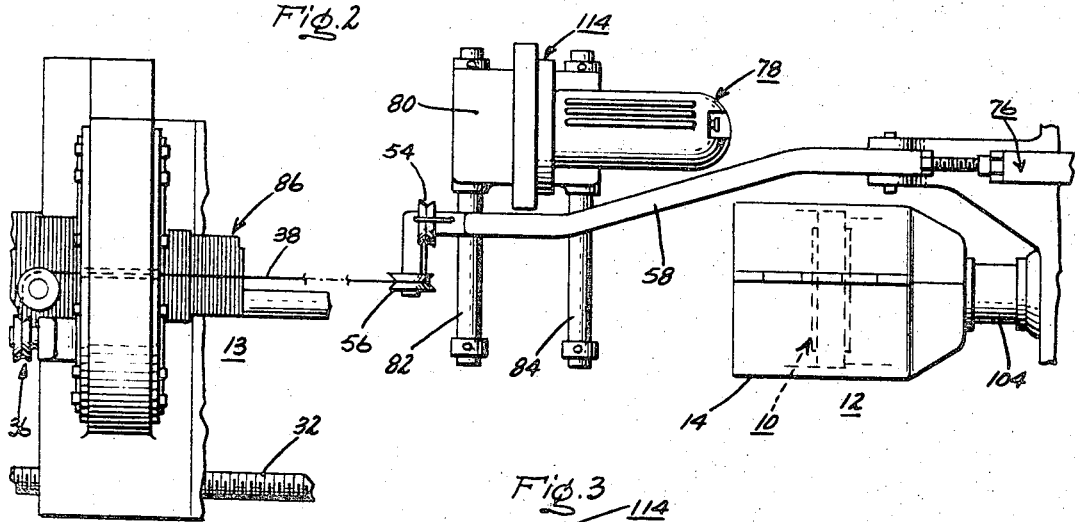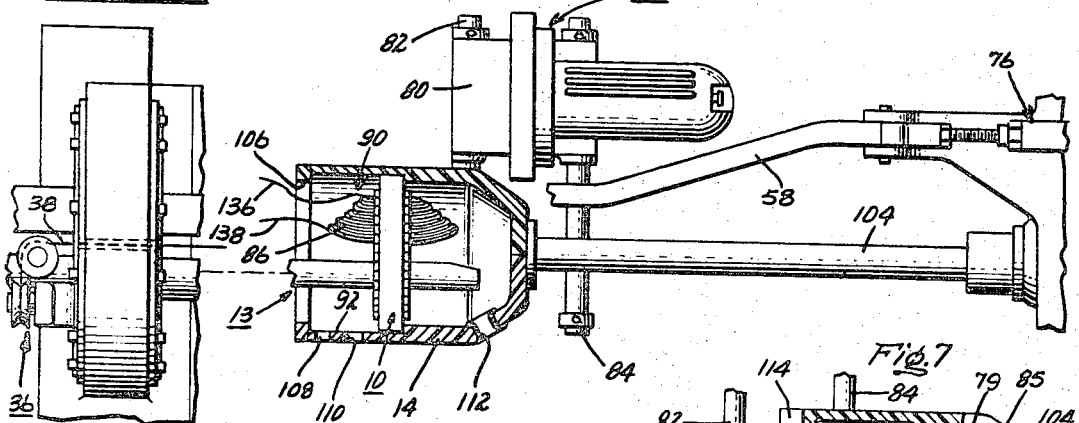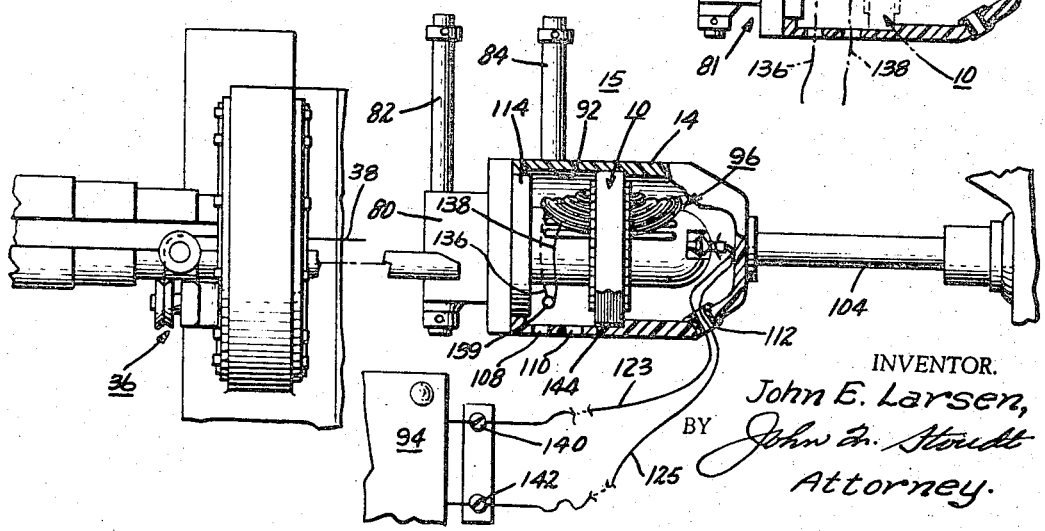

INVENTOR.
John E. Larsen,
BY John M. Stoudt
Attorney.

United States Patent Office 3,407,493
Patented Oct. 29, 1968

3,407,493
PROCESS OF DEVELOPING ELECTRICAL COILS
IN INDUCTIVE DEVICES
John E. Larsen, Fort Wayne, Ind., assignor to General
Electric Company, a corporation of New York
Original application July 28, 1966, Ser. No. 568,538.
Divided and this application Nov. 6, 1967, Ser.
No. 680,772
16 Claims. (Cl. 29—605)

ABSTRACT OF THE DISCLOSURE

Developing electrical coils in a magnetic core of inductive devices by mounting the core in a core carrier at a core-receiving station and transferring coils into slots of the core as it is supported by the carrier at a position adjacent a coil-winding station where the coils are formed from electrically conductive wire. While the core having the coils therein is still being supported by the same carrier, the coils are developed into the desired configurations by generating a surge of electrical energy in the coils. This procedure is efficient and economical to practice without the need for completely reconstructing existing winding equipment in order to achieved the benefits of the process.

*Cross-references to related applications*

This application is a division of my copending application Ser. No. 568,538, filed July 28, 1966, which, in turn, in part discloses subject matter disclosed in my still earlier filed application Ser. No. 414,822, filed Nov. 30, 1964, now Patent No. 3,333,327, issued on Aug. 1, 1967.

*Background of the invention*

The present invention relates to an improved process of developing electrical coils in inductive devices and improved apparatus for practicing the process. In particular, the invention relates to an improved process and apparatus for developing a number of conductor turns into electrical coils having a desired configuration and carried by such inductive devices as dynamoelectric machine stators and rotors.

In the construction of certain electrical inductive devices, electrical coils are wound from successive turns of individually insulated wire conductors which are normally accommodated in suitable slotted structures, such as slotted cores formed of magnetic material. Taking dynamoelectric machine stator members for example, especially those incorporated in small fractional horsepower electric motors, the magnetic core has a series of slots extending axially between the end faces of the core which carry side turn portions of the coils. The coil end turn portions project axially beyond the respective end faces of the core. In the development of such coils in stator cores, it is often necessary to press the side turn portions toward the slot bottoms and thus compact them in order to provide space in at least some of the slots for additional coils, such as the coils of start windings. Additionally, it is usually necessary to press-back the coil end turn portions toward the core end faces to approach the desired configuration away from the rotor receiving bore.

Still considering stators, one of the more attractive and generally accepted manufacturing approaches for developing the stator coils calls for winding a number of conductor turns on a stationary coil form at one location to form a wound coil and then transferring the wound coil to another location where it is inserted into the slots of a supported stator core. The machine providing inserted coils disclosed in the L. M. Mason Patent 2,934,099 is representative of one of the more desirable machines for accomplishing these steps. Thereafter, it was customary in the manufacture of the stator to remove the stator core from its support in the machine and to transport the stator core to another location having mechanical equipment for forcing back the end turn portions of the coil away from the bore. This was normally achieved in the past by the use of apparatus which engaged the outer surfaces of the coils for pressing them back. In addition, by the so-called coil transfer development process, as practiced by the aforementioned Mason machine, there was a practical difficulty in obtaining slot space factors above 55 percent without also using complicated apparatus for pressing the coil side turn portions toward the slot bottoms. Obviously, in the manufacture of stators by the coil transfer process, when it is desired to develop coils with pressed-back end turns and slot space factors over 55 percent, the necessity of using separate, elaborate coil press-back equipment does not lend itself to expeditious, mass production manufacturing techniques.

Certain recent innovations however, such as those disclosed in U.S. Patents 3,333,327–3,333,330 inclusive and 3,333,335, all of which issued on Aug. 1, 1967 and are assigned to the same assignee as the present application, utilize electrical energy in one form on another for achieving coil compaction and end turn press-back.

It is highly desirable to incorporate the electrical energy approach in connection with coil winding and inserting machines so that the electrical coils may be developed into a final configuration from conductor turns at one location. It is further desirable that the final configuration of the coils be achieved while at the same time coil conductor turns are being wound for insertion so that the development is achieved in the most expeditious and efficient manner, readily adapted to the mass production of stators. Moreover, the foregoing should be achieved by an arrangement which is readily incorporated in existing winding equipment, such as the Mason winding machine, without requiring extensive reconstruction of the equipment, and which achieves the desired slot space factors.

*Summary of the invention*

Accordingly, it is an object of the present invention to provide an improved process for developing electrical coils in inductive devices from conductor turns.

It is a more specific object of the present invention to provide an improved process for developing electrical coils in inductive devices which achieves at least some of the desired features mentioned above.

It is a further object of the present invention to provide a novel and improved process for developing electrical coils wound of conductor turns in a magnetic core, such as a stator core, which obviates the necessity for forcing back the coil portions at a location disposed away from the winding equipment and at the same time allows the desired final coil configuration to be achieved utilizing at least a part of existing equipment so that expensive and complete reconstruction is not required.

In carrying out the method of my invention in one form, I provide an improved process for developing the wound electrical coils carried by an electrical induction device such as a motor stator. In the illustrated exemplification, a length of electrically conductive insulated wire is wound on a stationary coil form at a winding station while a stator bore is disposed in a holding means or core carrier at a core-receiving station in spaced relation to the winding station. The core carrier is moved to the winding station and the wound coil is inserted in the coil-accommodating slots of the stator. The core carrier is then moved away from the winding station to a press-back station and, with the core still being supported in the carrier, at least one surge of high intensity electrical energy is generated in the wound coil in order to create electromagnetic forces which cause the side portions of the wound coil to be pressed-back into the coil-accommodating slots of the stator and the end turn portions of the coil to be pressed-back toward the stator end faces. While the surge of energy is being generated in the wound coil to achieve coil press-back, an additional length of electrically conductive insulated wire may be wound on the stationary coil form at the winding station for use in developing wound coils in either the same core or in a subsequent stator core.

My method of coil development is not only efficient and economical to practice, but also achieves the desired slot space factors and final coil configurations necessary to produce high quality stators. The method further is readily adaptable to the mass production of stators as it enables electrical coils to be fully developed in a stator core while the stator is retained in the original carrier in which it is held while the coils are being inserted therein.

The subject matter which I regard as my invention is particularly pointed out and distinctly claimed in the concluding portion of the specification. The invention itself however, taken with further objects and advantages thereof, may be best understood by reference to the following description taken in conjunction with the accompanying drawings.

Brief description of the drawings

FIGURE 1 is a partial side elevational view partially broken away, of a coil injection machine together with apparatus capable of practicing one form of my inventive method;

FIGURE 2 is a partial plan view of the machine illustrated in FIGURE 1 illustrating a first stage of coil development in accordance with an aspect of my invention wherein a wound electrical coil is being wound on a stationary coil form at a winding station and a stator core is mounted in a core carrier at a core-receiving station;

FIGURE 3 is a view similar to that of FIGURE 2 illustrating a second stage of coil development in accordance with an aspect of my invention wherein the wound coil has been transferred into the mounted stator core at the coil-transfer station, with the carrier being shown in cross section and the stator core in full;

FIGURE 4 is a view similar to that of FIGURES 2 and 3 illustrating a still further stage of coil development in accordance with an aspect of my invention, with an electrical fixture supported in the stator bore at a press-back station and connected across the output of an energy surge source, and with the wound coil group short circuited;

FIGURE 7 is a partial plan view, partially broken away and partially in section of a modified electrical fixture useful in the practice of my method supported in a core carrier.

Description of the preferred embodiments

Figure 6:
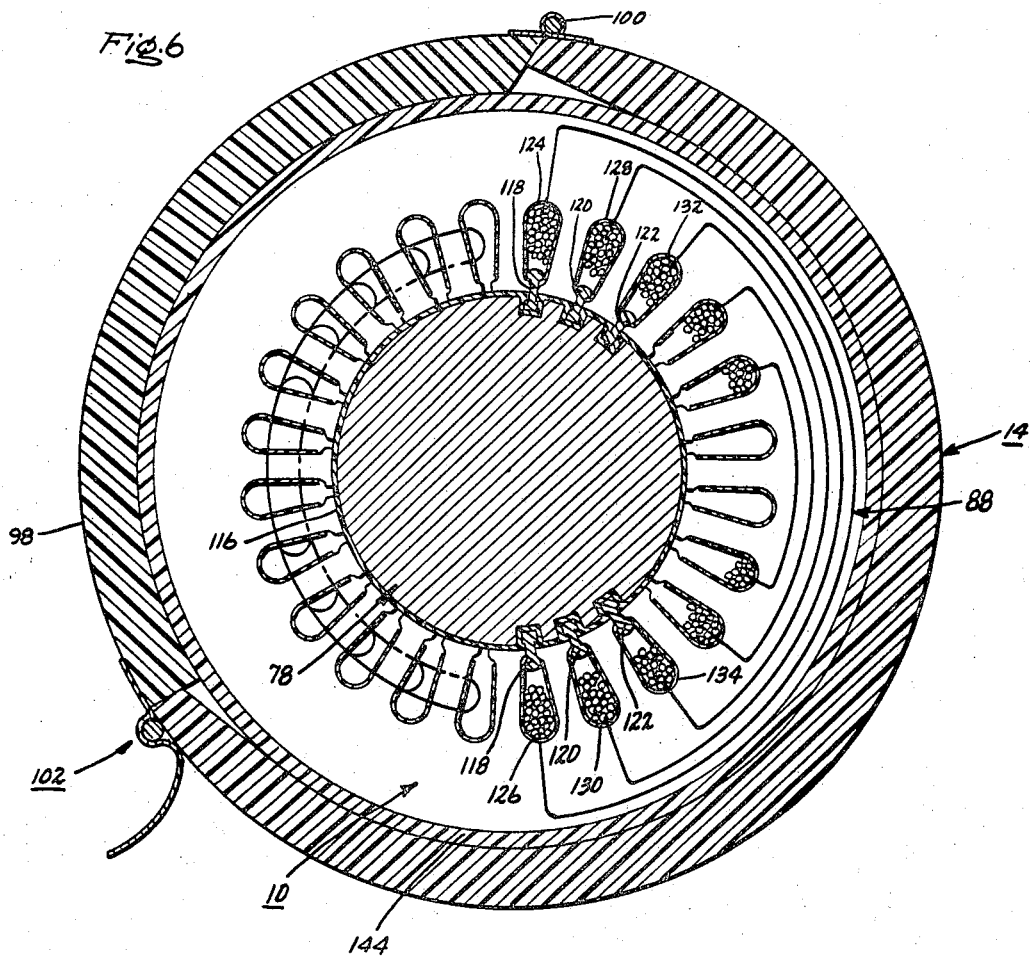
FIGURE 6 is an enlarged vertical section view taken through the carrier illustrated in FIGURES 1-5 showing an electrical fixture in cross section supported in the stator bore.

Having more specific reference now to the drawings, I have illustrated the various aspects of one form of my invention as applied to a two-pole stator core 10 of a dynamoelectric machine. In FIGURE 1 for example, I have shown the stator core 10 supported at a core-receiving station 12, the stator core 10 being mounted in a core carrier 14 at the core-receiving station 12 in upright position to enable wound coils to be developed therein.

As will be seen more clearly from the drawings and the more detailed description hereinafter, carrier 14 is mounted to move the stator core 10 from the core-receiving station 12 to a position or location adjacent a coil-winding station 13 where a wound coil group is formed (FIGURE 2) which is thereafter transferred into predetermined coil-accommodating slots of the core as it is being supported by carrier 14 (FIGURE 3). These coil forming and transferring or injecting operations may be accomplished in any suitable manner, by way of illustration, machine generally denoted by numeral 16 having the type of winding and transferring mechanisms disclosed more fully in the aforementioned Mason patent.

More specifically in the illustrated exemplification to drive the winding machine 16, suitable driving means in the form of a conventional electric motor 18 is mounted to transmit driving force to a pulley member 20 and thereby to a group of belts 22 which in turn transmit the driving force to a pulley member 24. A conventional clutch-brake apparatus generally indicated at 26 is interposed in the driving section adjacent the motor 18. A gear 27 is mounted adjacent the pulley 24 on the same shaft and is in driving engagement with a gear 28, the gear being mounted on a shaft extending into a conventional gear box 30. Rotation of the output shaft of motor 18 will cause rotation of a lead screw mechanism 32 to operate a counter mechanism 34 and as well to cause the rotation of a winding flyer 36. As the winding flyer 36 rotates, wire 38, conventionally electrically conductive insulative wire from a wire spool 40, is wound upon a stationary coil form 42. The stationary form 42 has five portions 44, 46, 48, 50 and 52 of respectively increasing diameter provided to form coils of five different sizes. Thus, the flyer and coil form arrangement provides a coil-winding station 13 for producing up to five wound coils of a coil group.

The electrically conductive insulative wire 38 is fed to the flyer 36 from the spool 40 over a pair of direction changing pulleys 54 and 56 which are supported on an arm 58 pivotally mounted on the machine by a pin 60, the pin 60 being supported on an arm portion 62 mounted in the housing 70 of a tailstock-like part 72 mounted on the bed 74 of the machine. The housing 70 also supports the carrier 14 as will be apparent from viewing FIGURE 1. A cylinder and piston assembly 76 is arranged to provide pivotal movement of the arm 58 about the pin 60.

Referring now specifically to FIGURES 2 through 5 inclusive, it will be seen that in accordance with my process of developing wound electrical coils, a plurality of turns 86 of the electrically conductive wire 33 are wound on the stationary coil form 42 at the coil-winding station 13 by the winding flyer 36 in order to form a wound coil group. At this time, the stator 10 is mounted in the carrier 14 at the core-receiving station 12, and the arm 58 is in the position illustrated by the lines in full in FIGURE 1. Thus, as a first stage in the development of the wound electrical coil group 88 shown in its final or fully developed form in FIGURE 5, the wound coil group is formed at the coil-winding station 13.

After the predetermined length of wire is wound on the stationary coil form 42, as is shown in FIGURE 3, the core carrier 14 with the core 10 mounted therein in position to receive the turns 86 from the coil form is transferred from the coil-receiving station 12 across the machine bed to a position adjacent the coil-winding station 13. At the coil-winding station, a suitable coil insertion mechanism, such as the type disclosed in the aforementioned Mason patent, acts to insert the turns 86 into predetermined coil-accommodating slots of the core. The turns 86 are transferred into the predetermined coil-accommodating slots at an initial location in the core 10, as denoted by reference numeral 90 in FIGURE 3.

As the next stage of my exemplified coil development process, it will be seen in FIGURE 4 that the core carrier 14 has been moved to a coil press-back station denoted by reference numeral 15 intermediate the core-receiving station 12 and the coil-winding station 13. At the coil press-back station 15 there is provided means for electrically coupling the turns 86 to an energy source 94 for establishing electromagnetic forces in the vicinity of the press-back station 15 to press-back and compact the turns 86. By way only of exemplification, I have shown the means in the form of a rigid conductor carrying structure 78 in FIGURES 2–6 inclusive. The structure 78 is illustrated and described in more detail and claimed in my copending United States patent application Ser. No. 568,588, filed July 28, 1966 and assigned to the same assignee as this application. In the exemplification, the structure 78 is supported on the machine bed 74 intermediate the core-receiving and coil-winding stations 12 and 13 respectively on a pair of tracks 82 and 84 which movingly support a mounting block 80 to which the structure 78 is suitably attached. The tracks are, of course, suitably fastened to the machine bed 74.

By way of another exemplification of means for establishing electromagnetic forces in the vicinity of the station 15, reference may be had to FIGURE 7, wherein I have shown other suitable apparatus for accomplishing this result. In this figure, I have illustrated a structure 79 of electrically conductive nonmagnetic material capable of conducing eddy currents mounted on a mounting block 81 similar to the block 80. The block 81 is also movably supported on the tracks 82 and 84 for movement into the path of the core carrier 14. Both structures 78 and 79 will be described in somewhat greater detail hereinafter. It should be understood, however, that in accordance with the principles of my invention, any suitable means for establishing electromagnetic forces in the vicinity of press-back station 15 may be used.

At the station 15, the structure 78 is inserted into a chamber 92 formed by the carrier 14 and into the bore of the station 10. In order to move the carrier 14 from the coil-winding station 13 to the press-back station 15 and insert the structure 78 therein, the carrier is first moved from the winding station 13 past the press-back station 15, and the structure is moved laterally on the tracks 82 and 84 across the machine bed and into the carrier path. Then, with the structure 78 interposed between the carrier 14 and the winding station 13, the carrier 14 is moved until the structure 78 rests in the bore of the stator 10. At the press-back station 15, electromagnetic forces are established in the vicinity of the coil turns by means of a suitable high energy surge source 94 for acting upon at least portions of the coil turns, thereby pressing back the portions of the wound coil turns away from their initial location 90 in the core 10 to the location shown in FIGURE 4 and denoted by reference numeral 96.

It will be understood that during the movement of the core carrier 14 from station to station, the arm 58 is raised by the cylinder and piston assembly 76 to the position illustrated by phantom lines in FIGURE 1, so as to be out of the path of the carrier 14. Also, while the core is moved from station to station, it is retained in the carrier 14. My process of developing wound electrical coils in the core 10 is therefore efficient and readily adaptable for the mass production of stator cores, as a minimum of handling of the core 10 is involved. Further, it will be appreciated that when the carrier 14 is moved to the press-back station 15 as illustrated in FIGURE 4, and during the step of establishing electromagnetic forces about the wound coil, the arm 58 may be lowered and a second predetermined length of electrically conductive wire may be wound at the coil-winding station 13 in order to be ready for insertion into another stator core for coil development therein or into the core 10 for further coil development. It should also be understood that, while I have shown the press-back station 15 at a location spaced from the core-receiving station 12, it is within the contemplation of my invention to provide a single station at which the core 10 may be initially mounted in the core carrier 14 and the press-back operation may later take place. This single station will replace the separate core-receiving and press-back stations 12 and 15, limiting the amount of movement required of the carrier 14.

In order to more fully explain how the method described above may be carried out in actual practice, I will now more fully describe the form of coil-developing apparatus used in the exemplification of the invention shown in FIGURES 2–5 and 6. It will be seen that the carrier 14 comprises an insulated generally cylindrical body forming the chamber 92 therein, the body having a cover portion 98 hinged as at 100 and having a latch as at 102 in order to admit and lock a stator core 10 therein. The core carrier 14 is mounted on a piston rod 104 which, by means of a suitable cylinder will move the core carrier between the stations 12, 13 and 15 as required to practice my exemplified method. The rod 104 may also be readily adapted to move only between two stations as explained above.

The core carrier 14 also includes an opening 106 at the forward end thereof for receiving the structure 78 and several apertures 108, 110, and 112 in the wall thereof for admitting electrical leads into the chamber 92. The forward opening 106 is shaped to receive the forward end 114 of the mounting block 80, and thus, as will be apparent from FIGURE 4, when the carrier 14 is at the press-back station 15 with the structure 78 resting therein, the opening 106 of the carrier is closed by the mounting block portion 114. At this time, the stator core will be completely enclosed in the carrier 14 with cover portion 98 closed, and thus the high energy surge of electrical energy injected into the rigid conductor means in accordance with my method will not constitute a hazard to operating personnel. On the other hand, if there is accidental electrical shorting or the like, in which case the air in the chamber 92 would be rapidly heated and expanded, I have provided by the apertures 108, 110, and 112 means for allowing the rapidly expanding air to escape from the chamber 92. Referring specifically to FIGURES 4 and 6, it will be noted that the chamber 92 is of sufficient diameter to accommodate a stator core larger than the stator core 10. Thus, an insulated annular spacer ring 144 is provided to accommodate stator cores of smaller diameter than the chamber therein.

It will be understood that the rigid conductor carrying structure 78 is only one exemplified form of apparatus that may be used to employ electrical energy as a portion of my coil-developing method to provide a clear understanding of this invention. Referring to FIGURE 6, the structure 78 is generally cylindrical and shaped to fit the bore of the stator core 10, having a rounded forward end which will enable the structure to be moved into the bore of the stator core 10, as it will push aside the end turn portions of the turns 86. The structure 78 is constructed of a nonmagnetic electrically conductive material such as copper or aluminum, which is capable of conducting eddy currents. I provide an insulation coating or sheath 116 between the core 10 and structure 78 to electrically insulate the structure from the conductor turns. The structure 78 carries thereon radially and axially extending conductor means in the form of three pairs of conductor bars 118, 120, and 122, the opposed conductor bars of each pair being serially connected and shaped to fit axially into a desired coil-accommodating slot carrying a plurality of conductor turns therein. This position will be seen in FIGURE 6, wherein the pair of conductor bars 118 are rigidly supported in the coil-accommodating slots 124 and 126, and the other pairs of conductor bars 120 and 122 are rigidly supported in opposed slots 128, 130 and 132, 134.

In order to establish electromagnetic forces in the vicinity of the wound coil in its intermediate developed condition 90 as illustrated in FIGURE 3 when using the structure 78, the free ends 136 and 138 of the turns are connected at 139 to provide a closed electrical path therethrough, and the pairs of conductor bars 118, 120 and 122 are connected by suitable leads 123, 125 across the output terminals 140 and 142 of the energy surge source 94. It will be understood that the energy surge source 94 may be of the type illustrated in the previously mentioned copending patent applications, and is capable of supplying a high electrical energy surge (for example, up to 6000 joules) into the conductor bars. A transient magnetic field is created, electromagnetically coupling the wound coil turns 86, by injecting a surge of electrical energy into the conductor bars. An interaction of electromagnetic forces is thereby effected since induced current will flow in the turns 86, creating a second transient magnetic field about the turns. The forces generated act to press-back the side portions of the wound coil turns toward the bottoms of their coil-accommodating slots, and as well to slightly press-back the end turn portions toward the end faces of stations 10 and 12.

Figure 5:
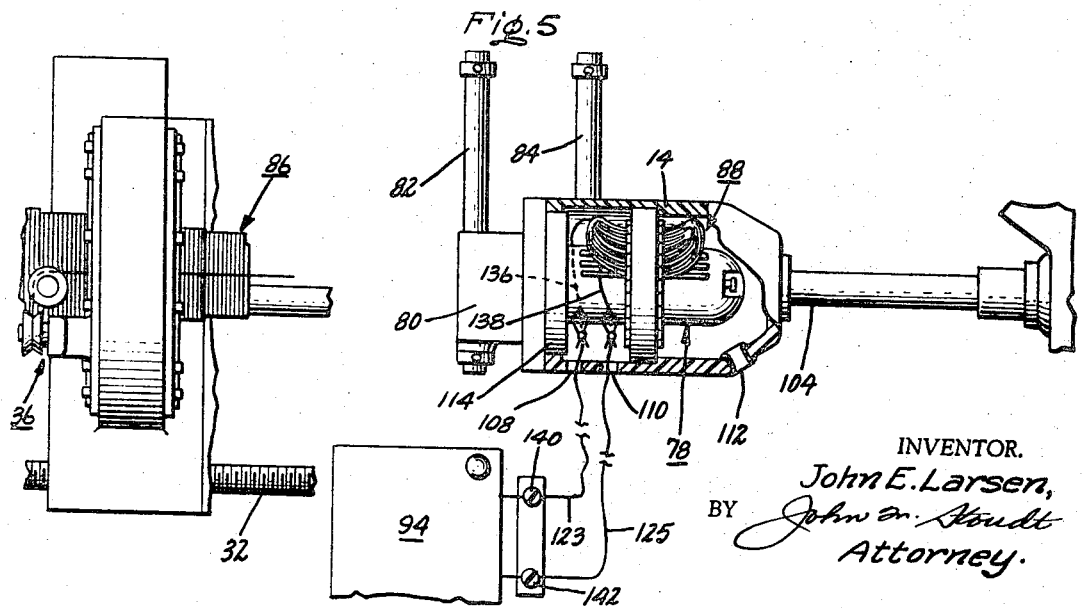
FIGURE 5 is a view similar to that of FIGURES 2-4 inclusive illustrating the final stage of coil development in accordance with an aspect of my invention, the wound coil group being connected across the output of an energy surge source.

In order to further press-back the end turn portions of the coil, it will be seen in FIGURE 5 that the connections to the output terminals 140 and 142 of the surge source 94 have been reversed. That is, the free ends 136 and 138 of the now partially developed wound coil turns 86 are connected to the output terminals 140 and 142, and the pairs of rigid conductor bars shorted to provide a closed path for the flow of induced current. By this arrangement, a surge or pulse of energy is injected into the turns, and electromagnetic forces are generated between the coil turns and the structure 78. The coil turns will then be forced to their final or fully developed position illustrated in FIGURE 5 and denoted by reference numeral 88, as the end turn portions are forced back toward the faces of the stator core 10 and the side portions of the coil are further pressed-back in the coil-accommodating slots. At this time, the two-pole stator core 10 will have one wound coil group 88 fully developed therein. In order to develop another wound coil group, the core may be inverted in the carrier 14 and my above described method repeated for the second coil group.

It will be understood that the electrical energy approach useful to practice a portion of my coil-developing method, i.e., to generate electromagnetic forces to press-back and compact coil turns, may be accomplished in various other ways. It is possible, for example, to inject an energy surge directly into the coil turns 86 without any structure in the bore, in the case of stator cores, thus establishing electromagnetic forces in the vicinity of the coil-accommodating slots to press-back and compact the coil turns. It is desirable, however, to position some type of fixture means in the stator bore, in this approach merely to push the coil turns into the coil-accommodating slots and thereby to insure that all the coil turns will be acted upon by the electromagnetic forces. Additionally, if it is desired to establish greater forces than are possible with the above approach, the fixture means may be in the form of a structure of electrically conductive nonmagnetic material, such as disclosed in FIGURE 7, so as to effect the forces established by the injection of electrical energy directly into the coil turns 86.

Referring to FIGURE 7, the structure 79 is an elongate generally cylindrical member, attached to the mounting block 81 by suitable attaching means 83 and insulated as at 85. The structure 79 does not carry any rigid conductor bars as does structure 78, but is meant only to affect the electromagnetic forces established in the coil turns. In this instance, my method of pressing back the coil turns 86 to develop a wound coil 88 in core 10 includes connecting the ends 136 and 138 of the coil turns 86 across the energy source 94 and injecting an energy surge into the turns. A transient magnetic field is thereby established about the turns, causing electromagnetic forces to push the turns toward the slot bottoms, away from the structure 79. The structure 79 causes the flux lines about the coil turns to be compressed and thus the forces generated to be increased in the desired direction toward the slot bottoms.

From the foregoing description of the method exemplifying my invention, it will be understood that I have disclosed a process of developing wound electrical coils which may be carried out in conjunction with existing machines without the necessity of completely reconstructing these machines. Further, the process provides the machines with a capability far beyond that originally contemplated. I have, therefore, provided an improved process for developing electrical coils in inductive devices which incorporates as part of it the use of electrical energy to compact and press-back wound coil turns in magnetic cores.

While in accordance with the Patent Statutes, I have described my invention by reference to particular embodiments thereof, it is to be understood that modifications may be made by those skilled in the art without actually departing from my invention. It is, therefore, intended in the following claims to cover all such equivalent variations as fall within the true spirit and scope of this invention.

What I claim as new and desire to secure by Letters Patent of the United States is:

1. A process of developing wound electrical coils in coil-accommodating slots of a magnetic core, the process comprising the steps of: mounting a magnetic core in a core carrier at a core-receiving station; winding a predetermined length of electrically conductive wire at a coil-winding station thereby forming a wound coil; transferring the wound coil into predetermined coil-accommodating slots of the magnetic core at an initial location in the core with the core in the core carrier; establishing electromagnetic forces in the vicinity of the wound coil at a press-back station adjacent the core-receiving station with the core in the core carrier for acting upon at least portions of the wound coil thereby to press-back the portions of the wound coil away from the initial location in the core.

2. The process of claim 1 including the additional step of supporting means at the press-back station for affecting the forces established in the vicinity of the wound coil.

3. The process of claim 2 wherein the step of supporting means for affecting the forces established in the vicinity of the wound coil includes supporting rigid conductor means adjacent the predetermined coil-accommodating slots of the magnetic core.

4. The process of claim 1 including the additional step of winding a second predetermined length of electrically conductive wire at the coil-winding station thereby forming a second wound coil while pressing back the portions of the first mentioned wound coil away from its initial location in the core.

5. The process of claim 1 wherein the step of establishing electromagnetic forces in the vicinity of the wound coil includes supporting rigid conductor means in the predetermined coil-accommodating slots, creating a closed electrical path in the wound coil, and injecting a surge of electrical energy into the rigid conductor means.

6. The process of claim 1 wherein the step of establishing electromagnetic forces in the vicinity of the wound coil includes injecting a surge of electrical energy into the wound coil thereby to establish a transient magnetic field about the wound coil and press-back the portions away from the initial location in the magnetic core.

7. A process of developing wound electrical coils in coil-accommodating slots of a magnetic core constructed to receive at least two wound coils having side portions and end turn portions, the process comprising the steps of: winding a length of electrically conductive wire at a coil-winding station and thereby forming a wound coil; supporting the magnetic core in holding means at a core-receiving station with the core positioned to receive the wound coil in predetermined coil accommodating slots; transferring the wound coil into the predetermined coil-accommodating slots at an initial location relative to the core with the core being maintained in the holding means; and generating a surge of electrical energy in the wound coil thereby to press-back at least one of the coil portions away from the initial location.

8. The process of claim 7 including maintaining the core in the holding means during the steps of transferring the wound coil into the coil-accommodating slots and generating a surge of electrical energy in the wound coil.

9. The process of claim 8 wherein the step of generating a surge of electrical energy in the wound coil includes injecting a surge of electrical energy into the wound coil and thereby generating a transient magnetic field about the wound coil.

10. The process of claim 8 wherein the step of generating a surge of electrical energy in the wound coil includes supporting conductor means at a press-back station in transformer coupled relationship with the wound coil, and injecting a surge of electrical energy into the conductor means thereby to induce a surge of electrical energy in the wound coil.

11. The process of claim 7 including the additional step of winding an additional length of electrically conductive wire at the coil-winding station after the wound coil has been transferred into the predetermined coil-accommodating slots and before the wound coil has been pressed-back away from the initial location.

12. A method of developing wound electrical coils in a magnetic core comprising: supporting the magnetic core in a core carrier at a core-receiving station; forming a wound coil of electrically conductive wire at a coil-winding station; moving the core carrier to the coil-winding station and transferring the wound coil into the core at a first location; and moving the core carrier away from the coil-winding station and generating a surge of electrical energy in the core-carried wound coil, thereby pressing back the wound coil to a second location in the core.

13. The method of claim 12 including the additional step of forming a second wound coil at the coil-winding station after the first mentioned wound coil has been transferred into the core.

14. A process of developing wound electrical coils in coil-accommodating slots of a magnetic core comprising the steps of: forming electrical coils from electrically conductive material at a coil-winding station; supporting a magnetic core in a core carrier disposed at a location adjacent the coil-winding station; transferring the electrical coils into preselected coil-accommodating slots of the magnetic core as the core is being supported by the core carier at the location adjacent the coil-winding station; and effecting the desired development of the electrical coils in the preselected slots as the magnetic core is being supported by the core carrier by generating a surge of electrical energy in the electrical coils to create a transient magnetic field and electromagnetic forces for acting upon the electrical coils thereby attaining the desired development.

15. The coil-developing of claim 14 wherein the magnetic core includes a bore in the vicinity of the coil-accommodating slots, and before effecting the desired development of the electrical coils in the preselected slots as the magnetic core is being supported by the core carrier, moving a rigid conductor-carrying structure transversely to the axis of the bore and then into the bore of the magnetic core, with the structure subsequently assisting in effecting the desired development of the electrical coils in the preselected slots.

16. The coil-developing process of claim 14 wherein after the step of transferring the electrical coils into preselected coil-accommodating slots of the magnetic core as the core is being supported by the core carrier at the location adjacent the coil-winding station, transporting the magnetic core having the electrical coils by the core carrier into a press-back station and electrically coupling the electrical coils in the press-back station to an electrical energy surge source for subsequently effecting the desired development of the electrical coils in the preselected slots as the magnetic core is being supported in the press-back station by the core carrier.

References Cited

UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,348,183 | 10/1967 | Hodges et al. | 336—223 |
| 3,353,251 | 11/1967 | Linkous | 29—205 |

JOHN F. CAMBELL, *Primary Examiner.*

J. CLINE, *Assistant Examiner.*